(12) United States Patent
Tanaka et al.

(10) Patent No.: US 10,940,430 B2
(45) Date of Patent: Mar. 9, 2021

(54) ACIDIC GAS RECOVERY SYSTEM AND RECLAIMING DEVICE TO BE USED IN SAME

(71) Applicant: Mitsubishi Heavy Industries Engineering, Ltd., Kanagawa (JP)

(72) Inventors: Hiroshi Tanaka, Tokyo (JP); Takuya Hirata, Tokyo (JP); Takashi Kamijo, Tokyo (JP); Tatsuya Tsujiuchi, Tokyo (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 265 days.

(21) Appl. No.: 16/070,103

(22) PCT Filed: Nov. 29, 2016

(86) PCT No.: PCT/JP2016/085337
§ 371 (c)(1),
(2) Date: Jul. 13, 2018

(87) PCT Pub. No.: WO2017/122443
PCT Pub. Date: Jul. 20, 2017

(65) Prior Publication Data
US 2019/0030480 A1    Jan. 31, 2019

(30) Foreign Application Priority Data
Jan. 14, 2016    (JP) .............................. JP2016-005487

(51) Int. Cl.
*B01D 53/14*    (2006.01)
*B01D 53/52*    (2006.01)
(Continued)

(52) U.S. Cl.
CPC ......... *B01D 53/1425* (2013.01); *B01D 53/14* (2013.01); *B01D 53/1456* (2013.01);
(Continued)

(58) Field of Classification Search
CPC ................ B01D 53/14; B01D 53/1425; B01D 53/1456; B01D 53/1462; B01D 53/1468; B01D 53/1475
See application file for complete search history.

(56) References Cited

U.S. PATENT DOCUMENTS 8,808,429 B2    8/2014    Woodhouse et al.
2013/0315809 A1    11/2013    Shimamura
(Continued)

FOREIGN PATENT DOCUMENTS

JP    2012-236170 A    12/2012
JP    2014-91091 A    5/2014
(Continued)

OTHER PUBLICATIONS

Extended European Search Report in corresponding of European Patent Application No. 16885046.9, dated Oct. 9, 2019 (7 pages).

*Primary Examiner* — Renee Robinson
(74) *Attorney, Agent, or Firm* — Osha Bergman Watanabe & Burton LLP (57) ABSTRACT

A reclaiming device that separates an absorption liquid from a coexisting material other than an absorbent includes: a gas-liquid separator that accepts the absorption liquid to be reclaimed together with water and separates the absorption liquid into a non-volatile material and a vaporized material; a first discharged liquid line that introduces a first discharged liquid discharged from the gas-liquid separator into the gas-liquid separator at a position below an absorption liquid introduction port; a first heater, disposed on the first discharged liquid line, that heats the first discharged liquid; a second discharged liquid line that introduces a second discharged liquid discharged from the gas-liquid separator into the gas-liquid separator at a position below a first discharged liquid introduction port; and a mixing tank, disposed on the
(Continued)

second discharged liquid line, that mixes the second discharged liquid with an alkaline agent.

13 Claims, 8 Drawing Sheets

(51) Int. Cl.
    *B01D 53/62*     (2006.01)
    *B01D 53/18*     (2006.01)

(52) U.S. Cl.
    CPC ..... *B01D 53/1468* (2013.01); *B01D 53/1475* (2013.01); *B01D 53/18* (2013.01); *B01D 53/52* (2013.01); *B01D 53/62* (2013.01); *B01D 2252/20478* (2013.01); *B01D 2257/304* (2013.01); *B01D 2257/504* (2013.01); *B01D 2258/01* (2013.01)

(56) References Cited

U.S. PATENT DOCUMENTS

| | | |
|---|---|---|
| 2014/0248206 A1 | 9/2014 | Tsujiuchi et al. |
| 2015/0083576 A1 | 3/2015 | Aboudheir et al. |
| 2016/0256825 A1 | 9/2016 | Tanaka et al. |
| 2016/0288049 A1 | 10/2016 | Tanaka et al. |

FOREIGN PATENT DOCUMENTS

| | | |
|---|---|---|
| JP | 2015-077581 A | 4/2015 |
| JP | 2015-089528 A | 5/2015 |
| WO | 2013/143001 A1 | 10/2013 |

ACIDIC GAS RECOVERY SYSTEM AND RECLAIMING DEVICE TO BE USED IN SAME

TECHNICAL FIELD

The present invention relates to an acidic gas recovery system and to a reclaiming device to be used in the same.

BACKGROUND ART

Various methods of removing and recovering acidic gases such as $CO_2$ and $H_2S$ contained in fossil fuel combustion exhaust gases and the like have heretofore been proposed. Among them, there is a method of removing and recovering an acidic gas from a combustion exhaust gas by bringing the combustion exhaust gas into contact with an amine absorption liquid such as an alkanolamine aqueous solution.

The aforementioned amine absorption liquid is subjected to cyclic use in which, after the liquid absorbs the acidic gas in an absorption column, the liquid is regenerated by releasing $CO_2$ in a regeneration column and is then used again for absorption of the acidic gas in the absorption column. However, this cyclic use may cause oxidative degradation of amine by oxygen in the exhaust gas, formation of amine nitrates and amine sulfates by absorption of residual NOx and residual SOx in the exhaust gas with amine, and inflow of solids such as soot and dust contained in the exhaust gas. As a consequence, coexisting materials such as degraded materials originated therefrom and impurities other than an absorbent are accumulated in the absorption liquid. These coexisting materials inhibit an absorbing performance of the absorption liquid. This is why a reclaiming treatment is carried out in order to separate these coexisting materials from the amine absorption liquid.

JP 2012-236170 A describes a reclaiming treatment in which a degraded absorption liquid having absorbed sulfur oxides is mixed with an alkaline agent having a higher hydroxyl ion concentration than that of the absorption liquid, and sulfur oxide salts thus formed are separated from the degraded absorption liquid by distillation. WO 2013/143001 describes a reclaiming treatment in which an amine salt is neutralized with an alkaline agent and then the resulting substance is recovered by vaporizing the amine by using an reclaimer. U.S. Pat. No. 8,808,429 describes a technique to obtain a vaporized material containing amine by supplying an absorption liquid and an alkaline agent to a reclaiming device and heating these substances.

JP 2015-89528 A describes a technique in which amine-containing vapor is recovered by supplying an absorption liquid and an alkaline agent to a reclaimer and heating these substances with a heating unit in the reclaimer, then the recovered vapor is cooled to condense coexisting materials such as high boiling-point substances entrained with amine, and then the coexisting materials are separated by gas-liquid separation. Meanwhile, JP 2015-77581 A describes a technique in which a mixture prepared by supplying an absorption liquid and an alkaline agent to a mixing tank and make its concentration uniform in advance is introduced into a reclaimer, and the mixture is heated with a heating unit in the reclaimer to recover amine-containing vapor, thereby preventing the liquid droplets in the reclaimer from being entrained with the recovered vapor.

REFERENCE DOCUMENT LIST

Patent Documents

Patent Document 1: JP 2012-236170 A
Patent Document 2: WO 2013/143001
Patent Document 3: U.S. Pat. No. 8,808,429
Patent Document 4: JP 2015-89528 A
Patent Document 5: JP 2015-77581 A

SUMMARY OF THE INVENTION

Problems to be Solved by the Invention

Each of the reclaiming treatments described in the documents cited above is configured to vaporize and recover the amine by heating the mixture prepared by adding the alkaline agent to the absorption liquid of a treatment target. As a consequence, this configuration creates problems of causing deposition of alkaline salts on a heater of each reclaiming device, thus leading to drop in heating efficiency and also causing bumping of the mixture in the meantime, whereby the vaporized material containing amine to be recovered entrains the alkaline agent as well as the coexisting materials including the degraded materials due to liquid entrainment and the reclaiming treatment ends up being insufficient.

In view of the above, it is an object of the present invention to provide an acidic gas recovery system which is capable of preventing a vaporized material to be recovered in a reclaiming treatment from entraining an impurity due to liquid entrainment and the like, and to provide a reclaiming device to be used in the same.

Means for Solving the Problem

To attain the object, an aspect of the present invention provides a reclaiming device configured to separate an absorption liquid from a coexisting material other than an absorbent, where the absorption liquid is to be cyclically used in order to absorb and remove an acidic gas from a treatment target gas by being brought into gas-liquid contact with the treatment target gas. The reclaiming device includes: a gas-liquid separator configured to accept introduction of the absorption liquid to be reclaimed together with water and to separate the absorption liquid into a non-volatile material and a vaporized material; a first discharged liquid line configured to introduce a first discharged liquid discharged from the gas-liquid separator into the gas-liquid separator at a position below an absorption liquid introduction port through which the absorption liquid is introduced into the gas-liquid separator; a first heater disposed on the first discharged liquid line and configured to heat the first discharged liquid; a second discharged liquid line configured to introduce a second discharged liquid discharged from the gas-liquid separator into the gas-liquid separator at a position below a first discharged liquid introduction port through which the first discharged liquid is introduced into the gas-liquid separator; and a mixing tank disposed on the second discharged liquid line and configured to mix the second discharged liquid with an alkaline agent.

The reclaiming device according to the present invention may further include a solid-liquid separator disposed on the second discharged liquid line and configured to subject a mixture mixed in the mixing tank to solid-liquid separation. In this case, a mixed liquid separated by the solid-liquid separator is introduced into the gas-liquid separator through the second discharged liquid line. Meanwhile, the reclaiming device according to the present invention may further include a mixed liquid circulating line configured to introduce part of the mixed liquid separated by the solid-liquid separator into the mixing tank.

The second discharged liquid in the second discharged liquid line may be part of wastewater to discharge the non-volatile material separated by the gas-liquid separator from a bottom part of the gas-liquid separator.

The water to be introduced into the gas-liquid separator together with the absorption liquid of the reclaiming target may be circulating water produced in a regeneration column configured to regenerate the absorption liquid having absorbed the acidic gas.

In an embodiment of the reclaiming device according to the present invention, the first discharged liquid in the first discharged liquid line may be part of wastewater to discharge the non-volatile material separated by the gas-liquid separator from the bottom part of the gas-liquid separator.

Meanwhile, in another embodiment of the reclaiming device according to the present invention, the gas-liquid separator may include at least one liquid collector located inside the gas-liquid separator and configured to allow passage of a gas from below upward and to block passage of a liquid from above downward. In this case, the first discharged liquid in the first discharged liquid line is an accumulated liquid accumulated in the at least one liquid collector, and the first discharged liquid introduction port through which the first discharged liquid is introduced from the first discharged liquid line into the gas-liquid separator is located between the absorption liquid introduction port and the liquid collector. A second discharged liquid introduction port through which the second discharged liquid is introduced from the second discharged liquid line into the gas-liquid separator is located below the liquid collector.

The reclaiming device of this embodiment may further include a second heater disposed on the second discharged liquid line and configured to heat the mixed liquid separated by the solid-liquid separator. Alternatively, the reclaiming device of this embodiment may further include: a water introducing line configured to introduce the water into the gas-liquid separator at a position below the at least one liquid collector; and a second heater disposed on the water introducing line and configured to heat the water.

In still another embodiment of the reclaiming device according to the present invention, the gas-liquid separator may include at least three liquid collectors located inside the gas-liquid separator and each configured to allow passage of a gas from below upward and to block passage of a liquid from above downward. In this case, the first discharged liquid in the first discharged liquid line is an accumulated liquid accumulated in the liquid collector in the middle of the at least three liquid collectors, and the first discharged liquid introduction port through which the first discharged liquid is introduced from the first discharged liquid line into the gas-liquid separator is located between the liquid collector in the middle and the liquid collector above the liquid collector in the middle. A second discharged liquid introduction port through which the second discharged liquid is introduced from the second discharged liquid line into the gas-liquid separator is located on a bottom part side of the liquid collector among the at least three liquid collectors which is located closest to the bottom part side.

The reclaiming device of this embodiment may further include a second heater disposed on the second discharged liquid line and configured to heat the mixed liquid separated by the solid-liquid separator. Alternatively, the reclaiming device of this embodiment may further include: a water introducing line configured to introduce the water into the gas-liquid separator at a position closer to the bottom part side than the liquid collector among the at least three liquid collectors which is located closest to the bottom part side; and a second heater disposed on the water introducing line and configured to heat the water.

The reclaiming device according to any of the above-mentioned embodiments may further include: a recovering line configured to discharge the vaporized material separated by the gas-liquid separator from a top part of the gas-liquid separator; and a compressor disposed on the recovering line and configured to compress the discharged vaporized material. Alternatively, the reclaiming device according to any of the above-mentioned embodiments may further include: a recovering line configured to discharge the vaporized material separated by the gas-liquid separator from a top part of the gas-liquid separator; a deep gas-liquid separator disposed on the recovering line and configured to subject the discharged vaporized material to gas-liquid separation; and a compressor configured to compress a gas component separated by the deep gas-liquid separator.

Another aspect of the present invention provides an acidic gas recovery system which includes: an absorption column configured to bring an absorption liquid into gas-liquid contact with a treatment target gas so as to absorb and remove an acidic gas from the treatment target gas; a regeneration column configured to regenerate the absorption liquid by heating the absorption liquid having absorbed the acidic gas in the absorption column so as to cause the absorption liquid to release the acidic gas; and the above-mentioned reclaiming device.

Effects of the Invention

According to the present invention, the absorption liquid as the reclaiming target is first supplied to and heated in the gas-liquid separator together with the water but without mixing the absorption liquid with an alkaline agent. Thus, it is possible to easily separate non-volatile materials such as amine nitrates and amine sulfates from a vaporized material containing amine that constitutes a main component of the absorption liquid. Moreover, the second discharged liquid containing the non-volatile materials is discharged thereafter through the second discharged liquid line and then the alkaline agent is added thereto in the mixing tank, thereby transforming the non-volatile materials into the original free-state amine not being any salts. Then, the mixed liquid containing the amine is again supplied to and heated in the gas-liquid separator so that the vaporized materials containing the amine can be recovered. Here, the mixed liquid containing deposited solids such as alkali sulfates attributed to addition of the alkaline agent is supplied to the gas-liquid separator. However, in the gas-liquid separator, the first discharged liquid discharged through the first discharged liquid line is heated with the first heater and is then supplied to the gas-liquid separator. As a consequence, it is possible to prevent the mixed liquid from bumping inside the gas-liquid separator, and thus to prevent the vaporized material to be recovered from entraining components in the gas-liquid separator due to liquid entrainment.

Moreover, by providing the solid-liquid separator on the downstream of the mixing tank, it is possible to remove the deposited solids such as the alkali sulfates formed due to addition of the alkaline agent, then to supply the mixed liquid containing the amine to the gas-liquid separator, and thus to more stably prevent the vaporized material to be recovered from entraining the components in the gas-liquid separator due to liquid entrainment.

MODES FOR CARRYING OUT THE INVENTION

Embodiments of an acidic gas recovery system and a reclaiming device to be used in the same according to the present invention will be described below in detail with reference to the accompanying drawings.

First Embodiment

Figure 1:
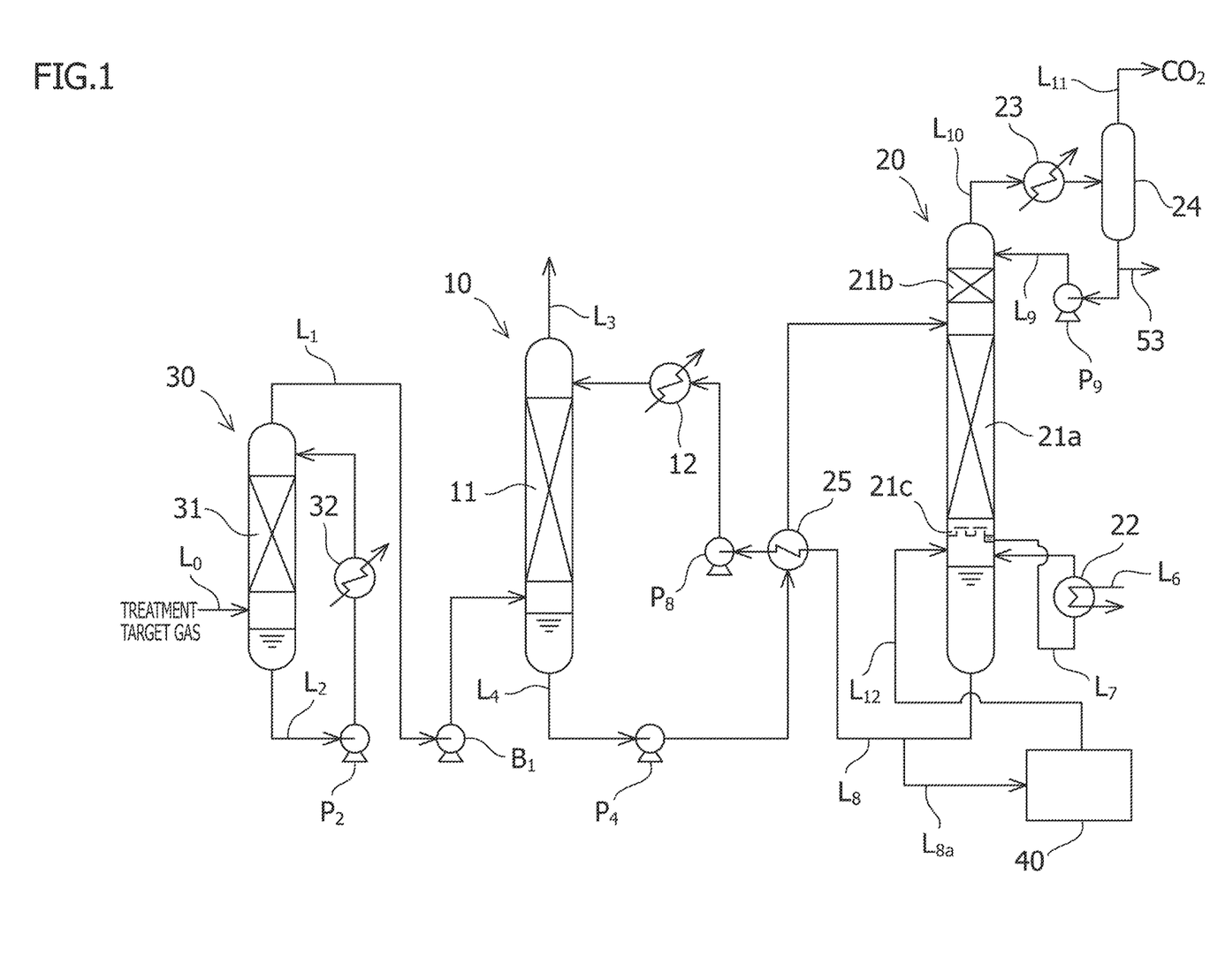
FIG. 1 is a schematic diagram showing an embodiment of an acidic gas recovery system according to the present invention.

As shown in FIG. 1, an acidic gas recovery system of this embodiment at least includes: an absorption column 10 configured to bring a treatment target gas containing $CO_2$ as an acidic gas and an amine absorption liquid as an absorption liquid for absorbing the acidic gas into gas-liquid contact so as to remove $CO_2$ from the treatment target gas by causing the amine absorption liquid to absorb $CO_2$; a regeneration column 20 configured to cause the amine absorption liquid having absorbed $CO_2$ (a rich absorption liquid) to release $CO_2$ so as to regenerate the amine absorption liquid (a lean absorption liquid) after releasing $CO_2$ as the absorption liquid for $CO_2$; and a reclaiming device 40 configured to separate the amine absorption liquid subjected to cyclic use as described above from coexisting materials other than an absorbent. A detailed configuration of the reclaiming device 40 of this embodiment is illustrated as a reclaiming device 40A in FIG. 2.

Figure 2:
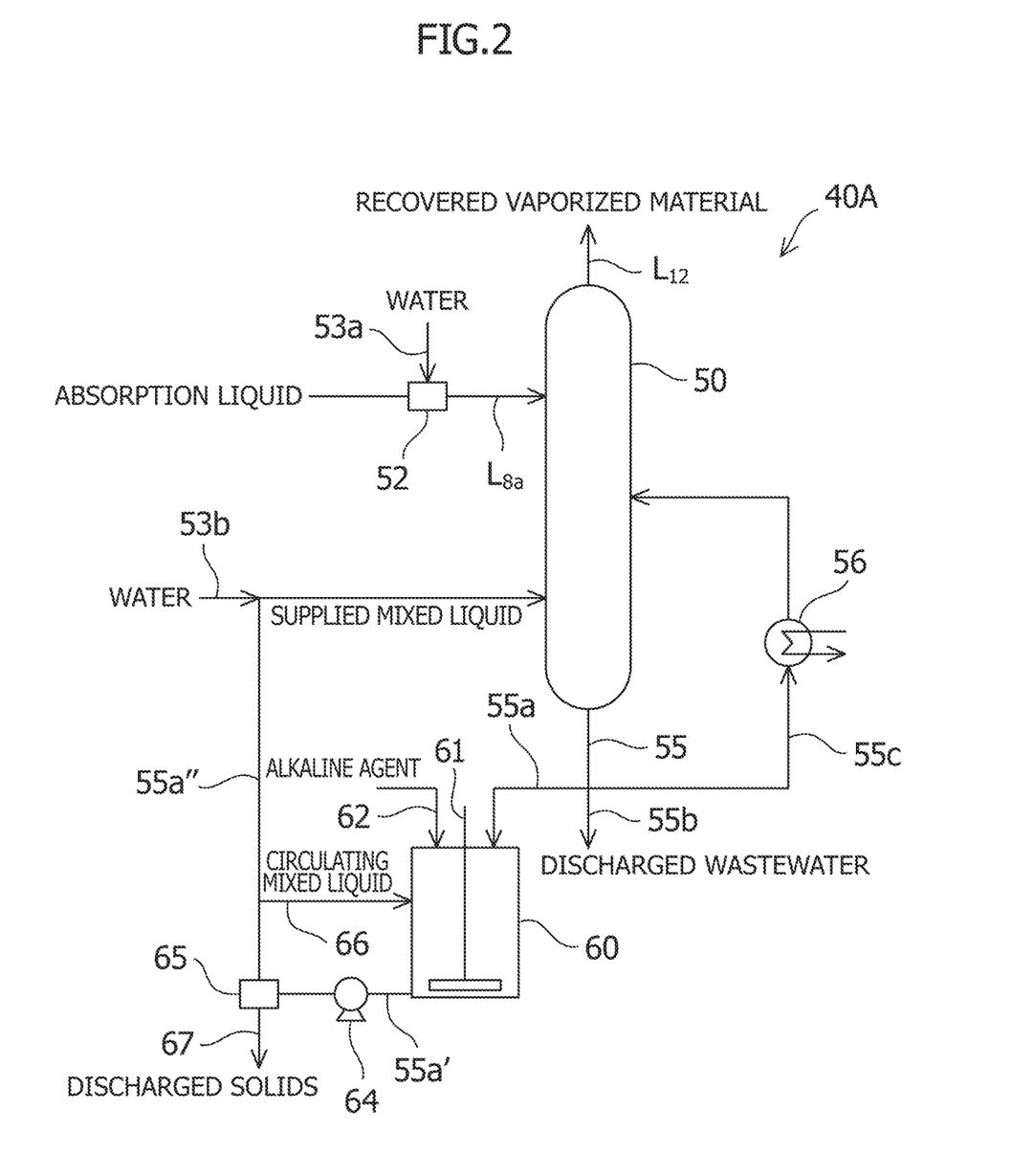
FIG. 2 is a schematic diagram showing a first embodiment of a reclaiming device in the acidic gas recovery system illustrated in FIG. 1.

This embodiment describes the case in which the acidic gas is $CO_2$. However, without limitation to the foregoing, the present invention functions similarly in the case in which the acidic gas is $H_2S$ or in the case in which the acidic gas includes both $CO_2$ and $H_2S$. Meanwhile, FIG. 1 and FIG. 2 are drawings for explaining an outline of this embodiment, and some instruments attached thereto are omitted in the drawings.

The absorption column 10 includes a line $L_1$ located at a lower part of the column and configured to supply the treatment target gas containing $CO_2$ into the absorption column 10, and a line $L_3$ located at a top part of the column and configured to discharge the treatment target gas deprived of the acidic gas from the absorption column 10. Moreover, the absorption column 10 includes a packed bed 11 located between connecting positions of these lines $L_1$ and $L_3$, in which the gas-liquid contact of the treatment target gas and the amine absorption liquid takes place. At a bottom part of the absorption column 10, a line $L_4$ is provided in order to send part of the amine absorption liquid having absorbed $CO_2$ (the rich absorption liquid) to the regeneration column 20. This line $L_4$ includes a pump $P_4$ configured to feed the amine absorption liquid and a heat exchanger 25 configured to perform heat exchange with the lean absorption liquid to be described later, which are arranged in sequence from the absorption column 10 side.

The regeneration column 20 includes a lower packed bed 21a located below a position of the line $L_4$ to which the rich absorption liquid is supplied and configured to release $CO_2$ from the rich absorption liquid, and an upper packed bed 21b configured to scrub the released $CO_2$ gas with circulating water to be described later. Moreover, the regeneration column 20 includes a liquid collector 21c located below the lower packed bed 21a. This liquid collector 21c is configured to allow passage of a gas from below upward and to block passage of a liquid from above downward. In addition, the liquid collector 21c is provided with a line $L_7$ configured to supply the absorption liquid accumulated in the liquid collector 21c from a lower part of the liquid collector 21c into the regeneration column 20. This line $L_7$ is provided with a reboiler 22 configured to heat the absorption liquid so as to cause the absorption liquid to release $CO_2$. The reboiler 22 is provided with a line $L_6$ configured to supply saturated steam for heating to the reboiler 22.

A line $L_{10}$ configured to discharge the $CO_2$ gas, which is released from the rich absorption liquid, from the regeneration column 20 is provided at a column top part of the regeneration column 20. A cooler 23 configured to cool the $CO_2$ gas down and a gas-liquid separator 24 configured to separate condensed water generated by the cooling from the $CO_2$ gas are provided on this line $L_{10}$. The gas-liquid separator 24 is provided with a line $L_9$ configured to supply the separated condensed water as the circulating water from above the upper packed bed 21 in the regeneration column 20, and a line $L_{11}$ configured to discharge the separated $CO_2$ gas from the system. The Line $L_9$ for the circulating water is provided with a water line 53 configured to supply the circulating water to the reclaiming device 40 to be described later, and a pump $P_9$ configured to feed the circulating water into the regeneration column.

A line $L_8$ configured to supply the lean absorption liquid, which is heated and regenerated by the reboiler 22, from above the packed bed 11 in the absorption column 10 is provided at a column bottom part of the regeneration column 20. This line $L_8$ is provided with: a line $L_{8a}$ configured to send the lean absorption liquid to the reclaiming device 40 so as to separate the coexisting materials other than the absorbent when the coexisting materials are accumulated in in the amine absorption liquid; the heat exchanger 25 configured to perform the heat exchange with the rich absorption liquid flowing on the line $L_4$; a pump $P_8$ configured to feed the lean absorption liquid; and a cooler 12 configured to cool the lean absorption liquid, which are arranged in sequence from the regeneration column 20 side.

Meanwhile, a cooling column 30 configured to cool the treatment target gas before supplying the treatment target gas to the absorption column 10 is provided on the upstream side of the absorption column 10 in terms of a flow direction of the treatment target gas. This cooling column 30 includes a line $L_0$ located at a lower part of the column and configured to supply the treatment target gas, and the line $L_1$ located at a top part of the column and configured to discharge the cooled treatment target gas from the cooling column 30 and to supply the gas to the absorption column 10. Moreover, the cooling column 30 includes a packed bed 31 located between connecting positions of these lines $L_0$ and $L_1$, in which cooling water and the treatment target gas are brought into contact with each other. The line $L_1$ for supplying the treatment target gas is provided with a blower $B_1$ configured to feed the treatment target gas. Meanwhile, a line $L_2$ is provided at a column bottom part of the cooling column 30 in order to supply the cooling water, which is accumulated at the column bottom part, to a section above the packed bed 31 in the cooling column 30. This line $L_2$ is provided with a cooler 32 configured to cool the cooling water.

The reclaiming device 40 is provided with: the line $L_{8a}$ configured to supply the lean absorption liquid, which is targeted for a reclaiming treatment, from the line $L_8$ for the lean absorption liquid to the reclaiming device 40; and a line $L_{12}$ configured to return the absorption liquid subjected to the reclaiming treatment by the reclaiming device 40 back to the regeneration column 20. The latter line $L_{12}$ is provided in such a way as to introduce the absorption liquid after the reclaiming treatment to a position closer to the bottom part of the regeneration column 20 than the location of the liquid collector 21c.

As shown in FIG. 2, the reclaiming device 40 mainly includes: a gas-liquid separator 50 configured to separate the lean absorption liquid of the treatment target from the line $L_8$ into non-volatile materials and a vaporized material by heating; a first heater 56 configured to heat part of wastewater containing the non-volatile materials separated by this gas-liquid separator and to return the wastewater to the gas-liquid separator; a mixing tank 60 configured to mix other part of this wastewater with an alkaline agent; and a solid-liquid separator 65 configured to perform solid-liquid separation on the mixture mixed in the mixing tank 60 and to return an obtained mixed liquid to the gas-liquid separator.

A mixer 52 provided with a water line 53a is installed on the line $L_{8a}$ to supply the treatment target lean absorption liquid to the gas-liquid separator 50. This mixer 52 is provided with a flowmeter (not shown) to measure a flow rate of the lean absorption liquid, an adjustment valve (not shown) to supply a predetermined amount of water from the water line 53a in accordance with a value of this flowmeter, and the like. The water line 53a is one of branches of the water line 53 for the circulating water obtained by the gas-liquid separator 24 in the regeneration column 20.

The gas-liquid separator 50 is the device configured to heat the supplied lean absorption liquid and to separate this liquid into the vaporized material including the amine that constitutes the main component of the amine absorption liquid, and into the non-volatile materials including degraded materials such as amine nitrates and amine sulfates (and solids such as alkali sulfates deposited by addition of the alkaline agent to be described later) which are formed as a consequence of reactions of the amine with NOx and SOx. In order to achieve efficient separation of the vaporized material and the non-volatile materials, a packing layer (not shown) including a filler is provided in the gas-liquid separator 50.

The line $L_{12}$ configured to send the recovered vaporized material, which is separated and recovered by the gas-liquid separator, to the regeneration column 20 is provided at a top part of the gas-liquid separator 50, and a discharged liquid line 55 configured to drain a discharged liquid, which contains the non-volatile materials left in the gas-liquid separator, from the gas-liquid separator is provided at a bottom part thereof. The discharged liquid line 55 is branched off into three lines, or more specifically, a mixed liquid line 55a for introducing part of the discharged liquid into the gas-liquid separator 50 again via the mixing tank 60 and the solid-liquid separator 65, a discharged wastewater line 55b for discharging part of the discharged water from the system, and a heating line 55c for introducing part of the discharged liquid into the gas-liquid separator 50 again via the first heater 56.

Moreover, the gas-liquid separator 50 is provided with an introduction port to introduce the lean absorption liquid through the line $L_{8a}$, an introduction port to introduce the heated discharged liquid through the heating line 55c, and an introduction port to introduce the mixed liquid through the mixed liquid line 55a, which are arranged in sequence from the top side toward the bottom side.

Although the first heater 56 disposed on the heating line 55c is not limited to a particular heater, the first heater 56 is preferably a heat exchanger which is provided with a line for supplying a heat source such as saturated steam to the first heater 56 in order to heat the discharged liquid flowing in the heating line 55c.

The mixing tank 60 and the solid-liquid separator 65 are disposed on the mixed liquid line 55a in sequence along the flow of the discharged liquid or the mixed liquid.

Besides the mixed liquid line 55a, the mixing tank 60 is provided with an agitator 61 configured to agitate the mixture inside the tank, and an alkaline agent line 62 configured to add the alkaline agent into the mixing tank 60. The mixed liquid line 55a that supplies the discharged liquid to the tank is provided with a flowmeter (not shown) to measure a flow rate of the discharged liquid, while the alkaline agent line 62 is provided with an adjustment valve (not shown) to supply a predetermined amount of the alkaline agent in accordance with a value of this flowmeter. Meanwhile, the mixture of the discharged liquid and the alkaline agent flows in a mixed liquid line 55a' between the mixing tank 60 and the solid-liquid separator 65, and this mixed liquid line 55a' is provided with a pump 64 configured to feed the mixture.

The solid-liquid separator 65 is the device configured to separate the mixture supplied from the mixing tank 60 into solids such as a solid deposited by the addition of the alkaline agent, and into the mixed liquid. For example, it is possible to use: a centrifugal separator such as a hydrocyclone; a filter strainer; and the like as the solid-liquid separator 65. The solid-liquid separator 65 is provided with a discharged solid line 67 configured to discharge the separated solids from the system.

The mixed liquid after separating the solids therefrom flows in a mixed liquid line 55a'' between the solid-liquid separator 65 and the gas-liquid separator 50. This mixed liquid line 55a'' is provided with a circulating mixed liquid line 66 configured to supply part of the mixed liquid to the mixing tank 60, and a water line 53b configured to add water to the mixed liquid to be supplied to the gas-liquid separator 50, which are arranged in sequence from the solid-liquid separator 65 side. The water line 53b is one of the branches of the water line 53 for the circulating water obtained by the gas-liquid separator 24 in the regeneration column 20. Here, the mixed liquid line 55a is provided with a valve (not shown) to stop the supply of the circulating water. Hence, it is also possible to supply only the water from the water line 53b to the gas-liquid separator 50.

According to the acidic gas recovery system of this embodiment provided with the above-described configuration, the treatment target gas containing $CO_2$ is first supplied from the line $L_0$ to and cooled in the cooling column 30. Here, examples of the treatment target gas are gases at least containing $CO_2$, which include natural gas, a process gas produced in a chemical plant for ammonia production and the like, a synthetic gas such as gasified coal gas, a combustion exhaust gas of a fossil fuel, and the like. In the cooling column 30, the treatment target gas is cooled down to a predetermined temperature in the packed bed 31 with the cooling water from the cooler 32, and then the gas is introduced into the lower part of the absorption column 10 through the line $L_1$ by using the blower $B_1$. In light of absorption efficiency in the absorption column 10, the treatment target gas is preferably cooled to a range from 30° C. to 40° C., for example. Here, the cooling water accumulated at the column bottom part of the cooling column 30 is cooled in the cooler 32 through the line $L_2$ by using a pump $P_2$, and is then supplied to the cooling column 30 for the cyclic use.

Subsequently, in the absorption column 10, the treatment target gas introduced from the line $L_1$ is brought into countercurrent contact at the packed bed 11 with the amine absorption liquid introduced from the line $L_8$ so as to cause the amine absorption liquid to absorb $CO_2$ in the treatment target gas, thereby removing $CO_2$ from the treatment target gas. Thus, it is possible to remove 90% or more of $CO_2$ from the treatment target gas. The amine absorption liquid is an aqueous solution of amine. As for the amine serving as its main component, it is possible to use alkanolamine such as monoethanolamine, diethanolamine, diisopropanolamine, methyldiethanolamine, and triethanolamine.

The treatment target gas deprived of $CO_2$ is discharged from the column top part of the absorption column 10 through the line $L_3$. The rich absorption liquid having absorbed $CO_2$ is accumulated at the column bottom part of the absorption column 10, and part of the rich absorption liquid is heated with the heat exchanger 25 through the line $L_4$ and is then supplied to the regeneration column 20. The rich absorption liquid supplied to the regeneration column 20 flows down and gets accumulated at the liquid collector 21c while releasing $CO_2$ by an endothermic reaction at the lower packed bed 21a. Then, the rich absorption liquid is supplied to the reboiler 22 through the line $L_7$ and heated by the heat exchange with the high-temperature saturated steam from the line $L_6$, whereby $CO_2$ in the rich absorption liquid is released. The saturated steam introduced into the reboiler 22 is condensed into saturated water as a consequence of the heat exchange with the absorption liquid and is discharged from the reboiler 22. The lean absorption liquid after releasing $CO_2$ is accumulated at the column bottom part of the regeneration column 20.

The $CO_2$ gas separated from the absorption liquid is brought into gas-liquid contact at the upper packed bed 21b of the regeneration column 20 with the circulating water supplied from the line $L_9$ to remove the entrained amine absorption liquid, and is then discharged from the column top part of the regeneration column 20 through the line $L_{10}$. Thereafter, the $CO_2$ gas is cooled with the cooler 23 to condense the entrained steam, thus being separated into the $CO_2$ gas and the condensed water with the gas-liquid separator 24. The separated $CO_2$ gas is discharged through the line $L_{11}$ and recovered as the high-purity $CO_2$ gas. Meanwhile, the condensed water is supplied to the regeneration column 20 through the line $L_9$ by using the pump $P_9$, and is reused as the circulating water. In addition, the condensed water is also reused in the reclaiming device 40 through the line 53. The lean absorption liquid accumulated at the column bottom part of the regeneration column 20 is introduced into the heat exchanger 25 through the line $L_8$, and is cooled by being brought into heat exchange with the rich absorption liquid. Then, the lean absorption liquid is further cooled with the cooler 12 and then supplied to the absorption column 10 for the cyclic use as the amine absorption liquid.

In this way, the amine absorption liquid is subjected to the cyclic use of absorbing $CO_2$ in the absorption column 10, then releasing $CO_2$ in the regeneration column 20, and then absorbing $CO_2$ again in the absorption column 10. However, this cyclic use may cause oxidative degradation of amine by oxygen in the exhaust gas, formation of amine nitrates and amine sulfates by reactions of residual NOx and residual SOx in the exhaust gas with amine, or incorporation of solids such as soot and dust contained in the exhaust gas, thus resulting in accumulation of coexisting materials such as degraded materials originated therefrom and impurities other than the absorbent in the absorption liquid. Accordingly, when these coexisting materials other than the absorbent are to be separated from the amine absorption liquid, part of the lean absorption liquid is introduced from the line $L_{8a}$ of the regeneration column 20 into the reclaiming device 40.

As shown in FIG. 2, in the reclaiming device 40, a predetermined amount of the circulating water in the regeneration column 20 is first supplied from the water line 53a to the lean absorption liquid on the line $L_{8a}$, then mixed by using the mixer 52, and then supplied to the gas-liquid separator 50. The lean absorption liquid and the water supplied into the gas-liquid separator 50 flow down through the packing layer (not shown), then are discharged from the discharged liquid line 55 at the bottom part and heated by the first heater 56 with the saturated steam and the like through the heating line 55c, and are then supplied to the gas-liquid separator 50 again. Regarding the heated absorption liquid, the free amine such as alkanolamine in the absorption liquid evaporates and ascends inside the gas-liquid separator 50 as the vaporized material together with the water. Then, these materials are heated by coming into countercurrent contact with the absorption liquid supplied from the line $L_{8a}$, and are recovered by the line $L_{12}$ at the top part. The vaporized material recovered by the line $L_{12}$ is sent to the regeneration column 20 and used again.

Temperatures for heating the absorption liquid by the gas-liquid separator 50 and by the first heater 56 are set equal to or above the boiling point of the mixture of the lean absorption liquid and the water supplied thereto. To be more precise, the temperatures are set in a range from 80° C. to 180° C. or preferably in a range from 100° C. to 150° C., for example. Note that a reason for supplying the water to the lean absorption liquid in the mixer 52 is to lower the boiling point by reducing the amine concentration in the absorption liquid targeted for heating. By lowering the boiling point, it is possible to increase a recovery rate of the main component of the absorption liquid such as alkanolamine to be recovered by the gas-liquid separator 50. Meanwhile, the circulating water in the regeneration column 20 is used as the aforementioned water because it is possible to keep the amine concentration of the absorption liquid constant by confining the water in this system within a system that is as closed as possible by reusing the water produced in the system.

The discharged liquid that is discharged from the discharged liquid line 55 at the bottom part of the gas-liquid separator 50 contains the non-volatile materials such as amine nitrates and amine sulfates. Part of this discharged liquid is supplied to the mixing tank 60 through the mixed liquid line 55a. A predetermined amount of the alkaline agent from the alkaline agent line 62 is added to the mixing tank 60 in conformity with the amount of supply of the discharged liquid, and the mixture of the discharged liquid and the alkaline agent is agitated by the agitator 61. The alkaline agent is preferably sodium hydroxide or sodium carbonate, for example. The alkaline agent added as described above is brought into reactions with the amine nitrates and the amine sulfates in the absorption liquid, thereby regaining the amine in the original free state not being any salts, and causing deposition of sodium sulfate and the like.

The mixture obtained in the mixing tank 60 is sent to the solid-liquid separator 65 through the mixed liquid line 55a' by using the pump 64. The solid-liquid separator 65 separates the mixture into the solids including the deposited solids such as sodium sulfate as mentioned above, and into the mixed liquid containing the amine aqueous solution. The separated solids are discharged from the system through the discharged solid line 67.

Part of the mixed liquid containing the amine aqueous solution obtained by using the solid-liquid separator 65 is returned from the circulating mixed liquid line 66 to the mixing tank 60. The circulation of the mixed liquid in the mixing tank 60 as described above has an advantage that it is possible to prevent accumulation of the deposited solids in the mixing tank 60 and the mixed liquid line, clogging of the lines, and the like. The rest of the mixed liquid is mixed with the water from the water line 53b and supplied to the gas-liquid separator 50 through the mixed liquid line 55a". In the gas-liquid separator 50, the amine in the free state, not being any salts attributed to addition of the alkaline agent, evaporates due to the heating with the first heater, and is recovered from the line $L_{12}$ as the vaporized material together with the water. Meanwhile, the coexisting materials such as amine nitrates and amine sulfates, and the deposited solids such as alkali sulfates are discharged from the system through the discharged wastewater line 55b at the bottom part.

As described above, the absorption liquid supplied from the line $L_{8a}$ is supplied to the gas-liquid separator 50 together with the water but without mixing the absorption liquid with the alkaline agent. Thus, it is possible to separate the non-volatile materials and the vaporized material easily by the heating at a relatively low temperature. Moreover, the alkaline agent is added in the mixing tank 60 to the discharged liquid being discharged through the discharged liquid line 55 and the mixed liquid line 55a and containing the non-volatile materials, thus transforming the non-volatile materials into the free-state amine. Then, the mixed liquid containing the amine is again supplied to and heated in the gas-liquid separator 50 to recover the vaporized materials containing the amine. Here, the gas-liquid separator 50 heats the discharged liquid discharged through the discharged liquid line 55 and the heating line 55c by using the first heater 56, and then the heated liquid is returned to the gas-liquid separator 50. As a consequence, although the mixed liquid containing the deposited solids attributed to addition of the alkaline agent is supplied to the gas-liquid separator 50, it is possible to prevent the mixed liquid from bumping inside the gas-liquid separator 50, and thus to prevent the vaporized material to be recovered from the line $L_{12}$ provided at the top part thereof from entraining components in the gas-liquid separator 50 due to liquid entrainment.

Figure 3:
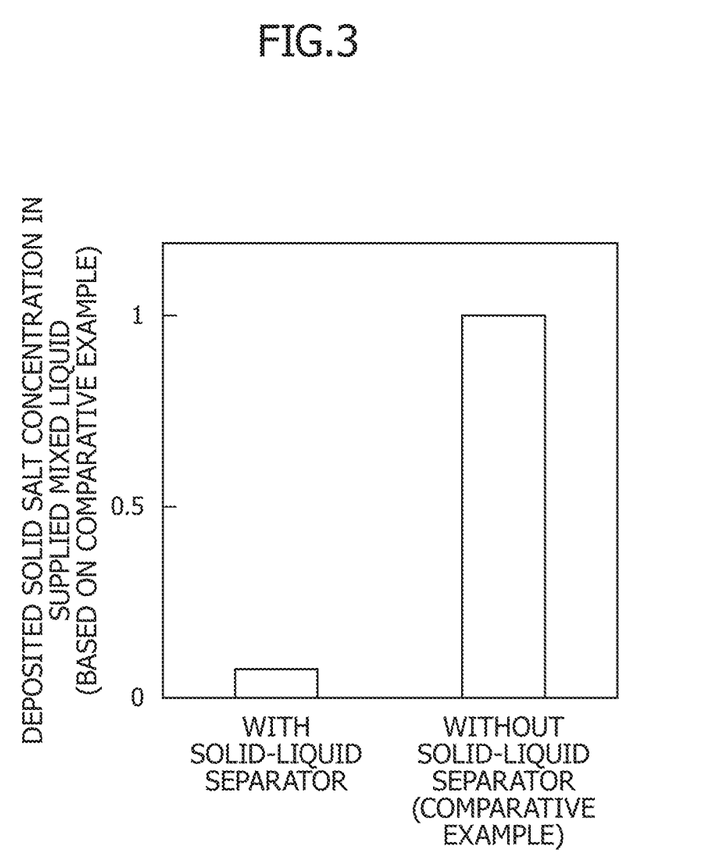
FIG. 3 is a graph showing a difference in solid deposited material salt concentration in the reclaiming device depending on the presence or absence of a solid-liquid separator.

Moreover, by providing the solid-liquid separator 65 on the downstream of the mixing tank 60, the mixed liquid is supplied to the gas-liquid separator 50 after being deprived of the deposited solids attributed to addition of the alkaline agent. Thus, it is possible to substantially reduce the concentration of the deposited solids in the mixed liquid in the mixed liquid line 55a" to supply the mixed liquid to the gas-liquid separator 50. FIG. 3 shows a concentration of a deposited solid salt in the mixed liquid to be supplied to the gas-liquid separator in the reclaiming device having the configuration illustrated in FIG. 2. As a comparative example, a concentration of a deposited solid salt in a gas-liquid mixture to be supplied to a first gas-liquid separator in the configuration disclosed in FIG. 2 of JP 2015-77581 A is indicated as 1 in FIG. 3. Since the gas-liquid separator is not provided in the comparative example, the configuration of the present invention illustrated in FIG. 2, which includes the gas-liquid separator, could reduce the concentration of the deposited solid salt down to about 10% as much as that of the comparative example.

Second Embodiment

Figure 4:
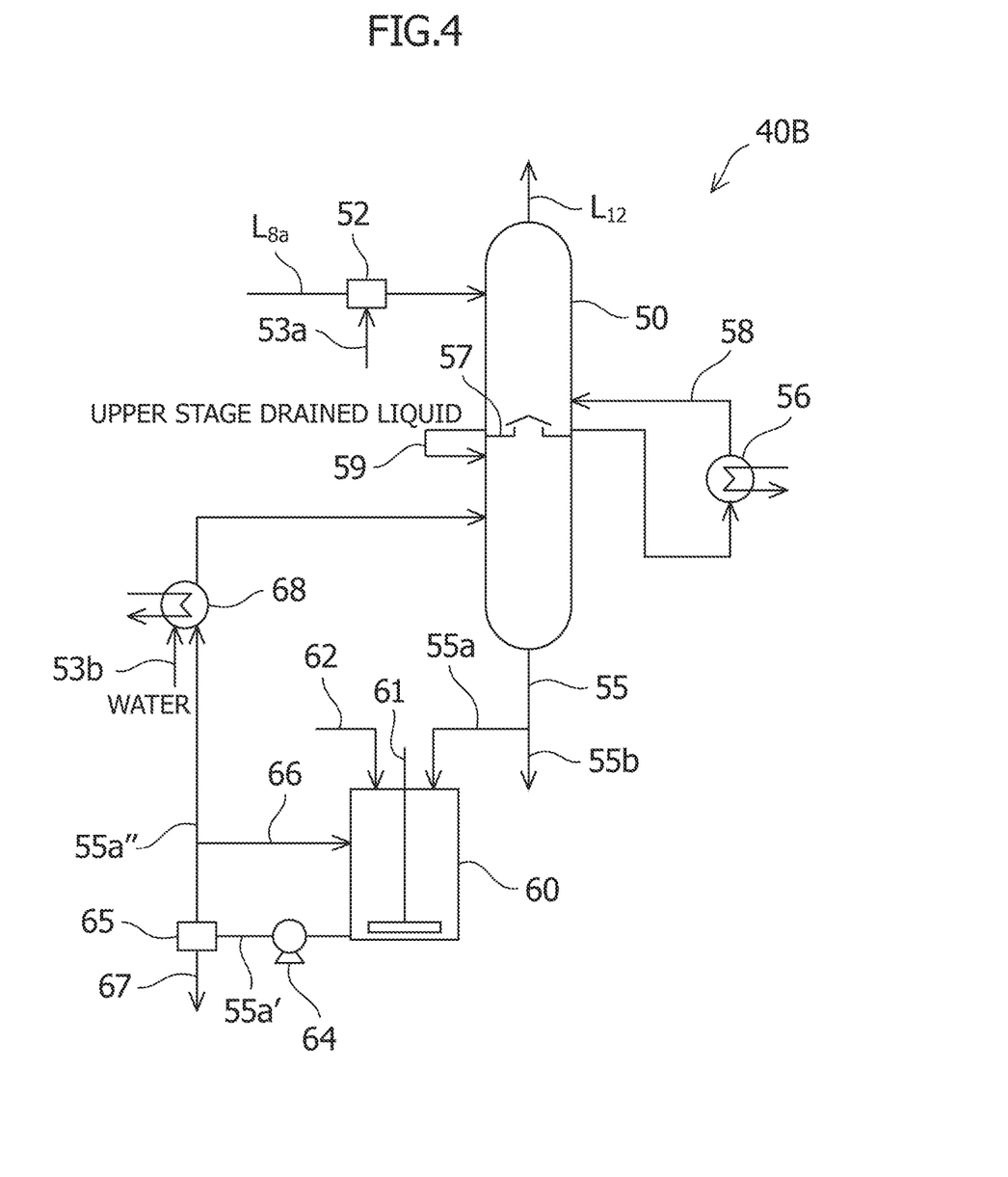
FIG. 4 is a schematic diagram showing a second embodiment of the reclaiming device in the acidic gas recovery system illustrated in FIG. 1.

As shown in FIG. 4, a reclaiming device 40B of a second embodiment is different from the reclaiming device 40A of the first embodiment mainly in that a liquid collector 57 configured to allow passage of a gas from below upward and to block passage of a liquid from above downward is provided inside the gas-liquid separator 50, that the first heater 56 is disposed on an accumulated liquid heating line 58 instead of the heating line 55c, the line 58 being configured to drain out an accumulated liquid accumulated in the liquid collector 57 and to introduce the heated accumulated liquid to a position between the introduction port for the absorption liquid of the line $L_{8a}$ and the liquid collector 57, and that the mixed liquid line 55a" is provided with a second heater 68 in order to heat the mixed liquid deprived of the solids by using the solid-liquid separator 65. The same components as those in FIG. 2 are denoted by the same reference numerals, and explanations thereof will be omitted herein.

Moreover, in the reclaiming device 40B of this embodiment, an introduction port for the mixed liquid to be introduced from the mixed liquid line 55a" into the gas-liquid separator 50 is located below the liquid collector 57. The water line 53b is located so as to perform the supply to the second heater 68 together with the mixed liquid in the mixed liquid line 55a". The gas-liquid separator 50 includes an upper stage discharged liquid line 59 configured to supply the accumulated liquid accumulated in the liquid collector 57 to a section below the liquid collector 57.

According to this embodiment, the mixed liquid from the mixed liquid line 55a" does not get mixed in the first heater 56 that heats the discharged liquid from the liquid collector 57 of the gas-liquid separator 50. For this reason, it is possible to more reliably prevent the vaporized material to be recovered from the line $L_{12}$ provided at the top part thereof from entraining the components in the gas-liquid separator 50 due to liquid entrainment. Note that the mixed liquid below the liquid collector 57 in the gas-liquid separator 50 can be heated to a predetermined temperature by using the second heater 68.

Third Embodiment

Figure 5:
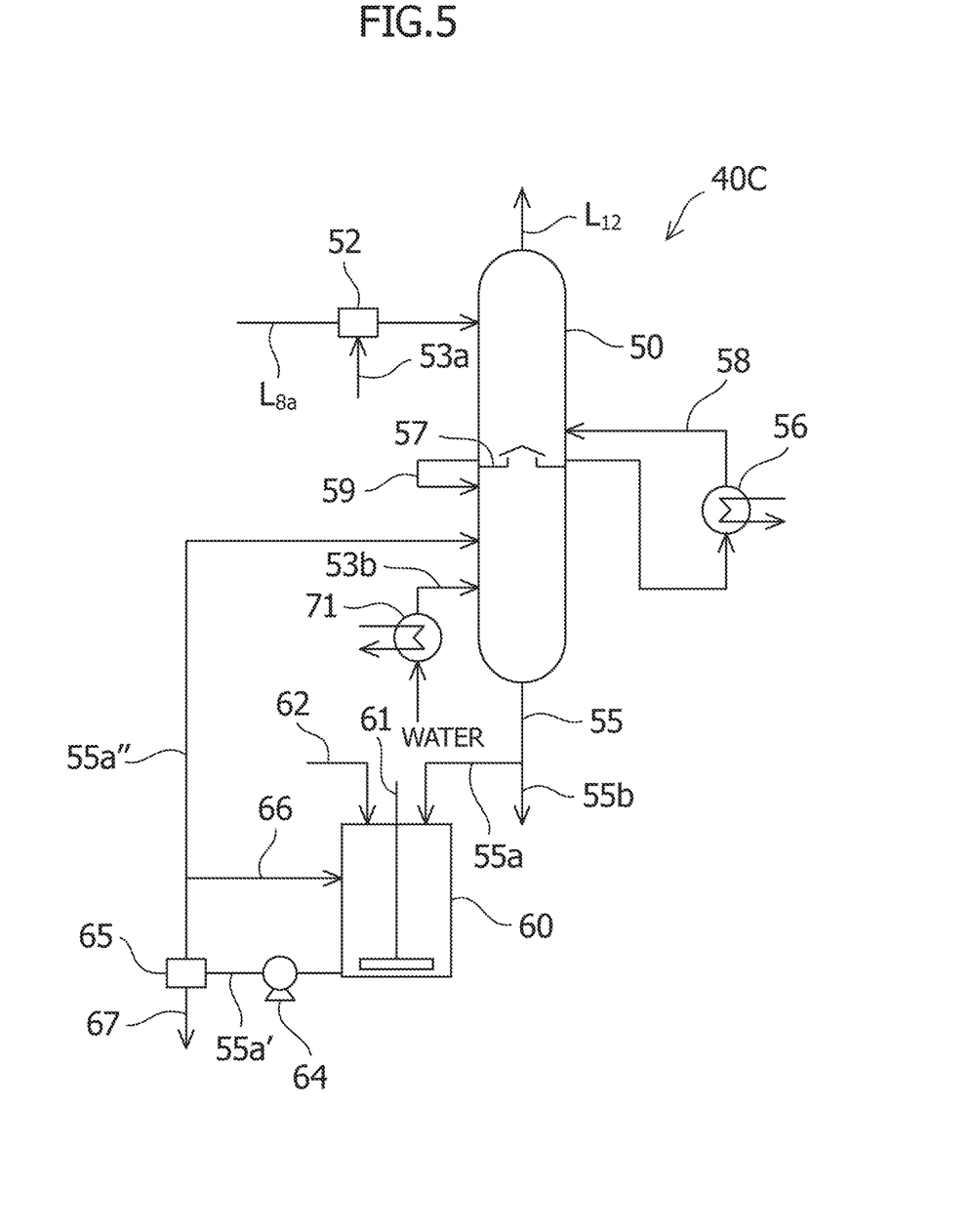
FIG. 5 is a schematic diagram showing a third embodiment of the reclaiming device in the acidic gas recovery system illustrated in FIG. 1.

As shown in FIG. 5, a reclaiming device 40C of a third embodiment is different from the reclaiming device 40B of the second embodiment mainly in that a second heater 71 is disposed on the water line 53b instead of the mixed liquid line 55a", the water line 53b being configured to supply the water to the gas-liquid separator 50. The same components as those in FIG. 4 are denoted by the same reference numerals, and explanations thereof will be omitted herein.

According to this embodiment, since the second heater 71 is disposed on the water line 53b, the mixed liquid is not supplied to the second heater 71 in comparison with the second embodiment. For this reason, it is possible to more reliably prevent the solids from being deposited on the heater and to more reliably prevent the bumping in the second heater 71, and thus to perform an operation more stably.

Fourth Embodiment

Figure 6:
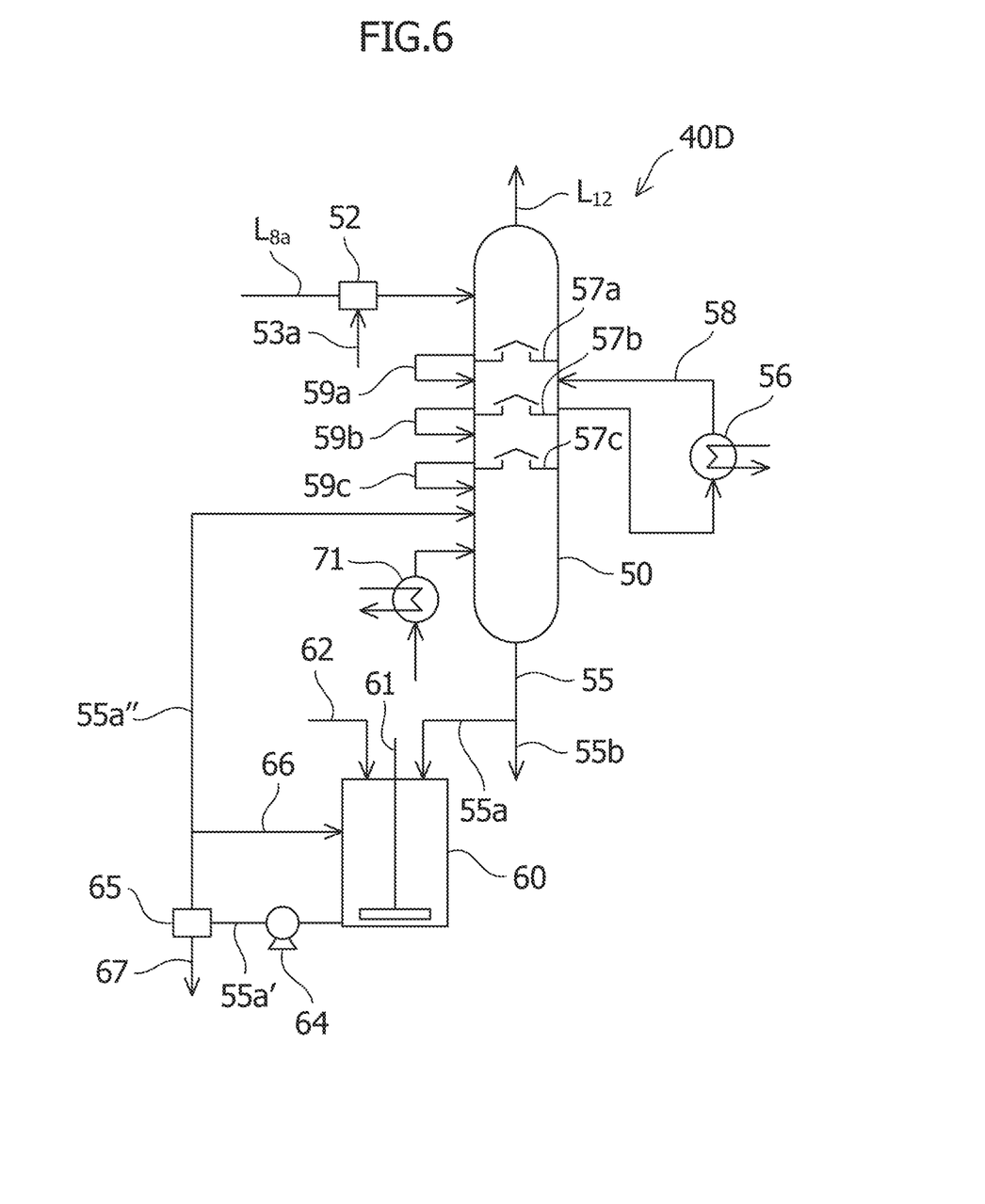
FIG. 6 is a schematic diagram showing a fourth embodiment of the reclaiming device in the acidic gas recovery system illustrated in FIG. 1.

As shown in FIG. 6, a reclaiming device 40D of a fourth embodiment is different from the reclaiming device 40C of the third embodiment mainly in that three stages of liquid collectors 57a, 57b, and 57c are provided inside the gas-liquid separator 50, that the first heater 56 is disposed on the accumulated liquid heating line 58 configured to drain out an accumulated liquid accumulated in the liquid collector 57b in the middle of the three stages and to introduce the heated accumulated liquid to a position between the introduction port for the absorption liquid of the line $L_{8a}$ and the liquid collector 57a at the top stage, and that three upper stage discharged liquid lines 59a, 59b, and 59c are provided in order to supply the accumulated liquid accumulated in the three stages of the liquid collectors 57a, 57b, and 57c to sections below these liquid collectors, respectively. The same components as those in FIG. 5 are denoted by the same reference numerals, and explanations thereof will be omitted herein.

According to this embodiment, the discharged liquid heated by the first heater 56 is supplied to a position below the liquid collector 5757a at the top stage. For this reason, even if liquid entrainment occurs in the first heater 56, it is possible to more reliably prevent the vaporized material to be recovered from the line $L_{12}$ from entraining the components in the gas-liquid separator 50 due to the liquid entrainment.

Fifth Embodiment

Figure 7:
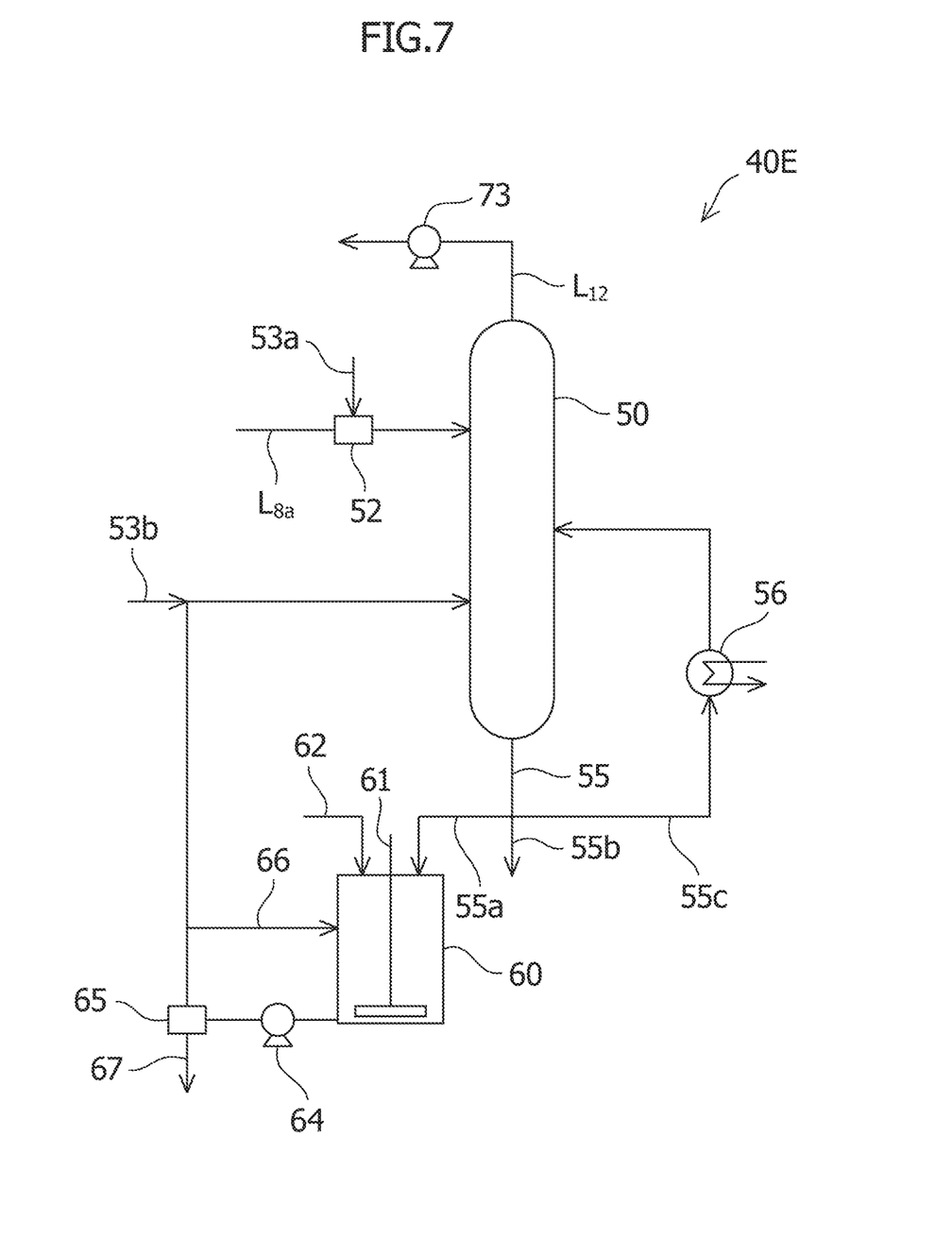
FIG. 7 is a schematic diagram showing a fifth embodiment of the reclaiming device in the acidic gas recovery system illustrated in FIG. 1.

As shown in FIG. 7, a reclaiming device 40E of a fifth embodiment is different from the reclaiming device 40A of the first embodiment in that the line $L_{12}$ at the top part of the gas-liquid separator 50 is provided with a compressor 73 configured to compress the vaporized material. The same components as those in FIG. 2 are denoted by the same reference numerals, and explanations thereof will be omitted herein.

According to this embodiment, as a consequence of providing the compressor 73 to the line $L_{12}$ for the absorption liquid from the gas-liquid separator 50 to the regeneration column 20, it is possible to perform an operation stably at a lower operating pressure than that applied to the regeneration column 20.

Sixth Embodiment

Figure 8:
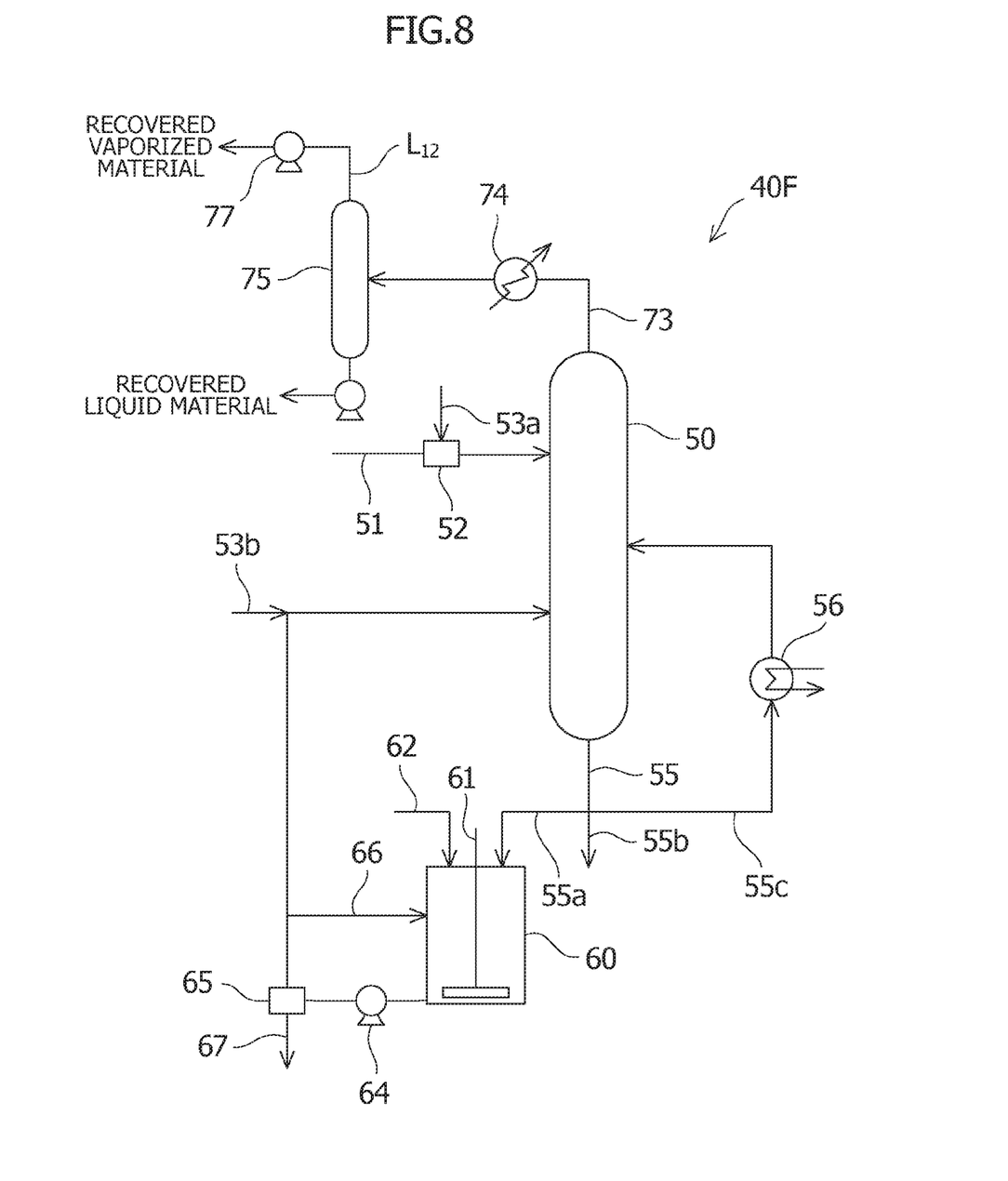
FIG. 8 is a schematic diagram showing a sixth embodiment of the reclaiming device in the acidic gas recovery system illustrated in FIG. 1.

As shown in FIG. 8, a reclaiming device 40F of a sixth embodiment is different from the reclaiming device 40E of the sixth embodiment in that the line $L_{12}$ at the top part of the gas-liquid separator 50 is sequentially provided with a cooler 74 configured to cool the vaporized material and a deep gas-liquid separator 75 configured to subject the cooled vaporized material to gas-liquid separation, and that the line $L_{12}$ is provided with a compressor 77 configured to compress the separated and recovered vaporized material. The same components as those in FIG. 7 are denoted by the same reference numerals, and explanations thereof will be omitted herein.

According to this embodiment, impurities included in the recovered vaporized material can be removed by using the deep gas-liquid separator 75 in comparison with the fifth embodiment. Thus, it is possible to conduct the reclaiming treatment at high accuracy.

REFERENCE SYMBOL LIST

10 absorption column
20 regeneration column
22 reboiler
30 cooling column
40 reclaiming device
50 gas-liquid separator
56 first heater
57 liquid collector
60 mixing tank
65 solid-liquid separator
68, 71 second heater
73, 77 compressor
74 cooler
75 deep gas-liquid separator

The invention claimed is:

1. A reclaiming device configured to separate an absorption liquid from a coexisting material other than an absorbent, the absorption liquid being cyclically used in order to absorb and remove an acidic gas from a treatment target gas by being brought into gas-liquid contact with the treatment target gas, comprising:
    a gas-liquid separator configured to accept introduction of the absorption liquid to be reclaimed together with water and to separate the absorption liquid into a non-volatile material and a vaporized material;
    a first discharged liquid line configured to introduce a first discharged liquid discharged from the gas-liquid separator into the gas-liquid separator at a position below an absorption liquid introduction port through which the absorption liquid is introduced into the gas-liquid separator;
    a first heater disposed on the first discharged liquid line and configured to heat the first discharged liquid;
    a second discharged liquid line configured to introduce a second discharged liquid discharged from the gas-liquid separator into the gas-liquid separator at a position below a first discharged liquid introduction port through which the first discharged liquid is introduced into the gas-liquid separator;
    a mixing tank disposed on the second discharged liquid line and configured to mix the second discharged liquid with an alkaline agent;
    a solid-liquid separator disposed on the second discharged liquid line and configured to subject a mixture mixed in the mixing tank to solid-liquid separation,
    wherein a mixed liquid separated by the solid-liquid separator is introduced into the gas-liquid separator through the second discharged liquid line; and
    a mixed liquid circulating line configured to introduce part of the mixed liquid separated by the solid-liquid separator into the mixing tank.

2. The reclaiming device according to claim 1, wherein the second discharged liquid in the second discharged liquid line is part of wastewater to discharge the non-volatile material separated by the gas-liquid separator from a bottom part of the gas-liquid separator.

3. The reclaiming device according to claim 1, wherein the first discharged liquid in the first discharged liquid line is part of wastewater to discharge the non-volatile material separated by the gas-liquid separator from a bottom part of the gas-liquid separator.

4. The reclaiming device according to claim 1, wherein
the gas-liquid separator includes at least one liquid collector located inside the gas-liquid separator and configured to allow passage of a gas from below upward and to block passage of a liquid from above downward,
the first discharged liquid in the first discharged liquid line is an accumulated liquid accumulated in the at least one liquid collector, and the first discharged liquid introduction port through which the first discharged liquid is introduced from the first discharged liquid line into the gas-liquid separator is located between the absorption liquid introduction port and the liquid collector, and
a second discharged liquid introduction port through which the second discharged liquid is introduced from the second discharged liquid line into the gas-liquid separator is located below the liquid collector.

5. The reclaiming device according to claim 4, further comprising:
a second heater disposed on the second discharged liquid line and configured to heat the mixed liquid separated by the solid-liquid separator.

6. The reclaiming device according to claim 4, further comprising:
a water introducing line configured to introduce the water into the gas-liquid separator at a position below the at least one liquid collector; and
a second heater disposed on the water introducing line and configured to heat the water.

7. The reclaiming device according to claim 1, further comprising:
a recovering line configured to discharge the vaporized material separated by the gas-liquid separator from a top part of the gas-liquid separator; and
a compressor disposed on the recovering line and configured to compress the discharged vaporized material.

8. The reclaiming device according to claim 1, further comprising:
a recovering line configured to discharge the vaporized material separated by the gas-liquid separator from a top part of the gas-liquid separator;
a final gas-liquid separator disposed on the recovering line and configured to subject the discharged vaporized material to gas-liquid separation; and
a compressor configured to compress a gas component separated by the final gas-liquid separator.

9. A reclaiming device configured to separate an absorption liquid from a coexisting material other than an absorbent, the absorption liquid being cyclically used in order to absorb and remove an acidic gas from a treatment target gas by being brought into gas-liquid contact with the treatment target gas, comprising:
a gas-liquid separator configured to accept introduction of the absorption liquid to be reclaimed together with water and to separate the absorption liquid into a non-volatile material and a vaporized material;
a first discharged liquid line configured to introduce a first discharged liquid discharged from the gas-liquid separator into the gas-liquid separator at a position below an absorption liquid introduction port through which the absorption liquid is introduced into the gas-liquid separator;
a first heater disposed on the first discharged liquid line and configured to heat the first discharged liquid;
a second discharged liquid line configured to introduce a second discharged liquid discharged from the gas-liquid separator into the gas-liquid separator at a position below a first discharged liquid introduction port through which the first discharged liquid is introduced into the gas-liquid separator;
a mixing tank disposed on the second discharged liquid line and configured to mix the second discharged liquid with an alkaline agent; and
a solid-liquid separator disposed on the second discharged liquid line and configured to subject a mixture mixed in the mixing tank to solid-liquid separation, wherein
a mixed liquid separated by the solid-liquid separator is introduced into the gas-liquid separator through the second discharged liquid line, and
the water to be introduced into the gas-liquid separator together with the absorption liquid to be reclaimed is circulating water produced in a regeneration column configured to regenerate the absorption liquid having absorbed the acidic gas.

10. A reclaiming device configured to separate an absorption liquid from a coexisting material other than an absorbent, the absorption liquid being cyclically used in order to absorb and remove an acidic gas from a treatment target gas by being brought into gas-liquid contact with the treatment target gas, comprising:
a gas-liquid separator configured to accept introduction of the absorption liquid to be reclaimed together with water and to separate the absorption liquid into a non-volatile material and a vaporized material;
a first discharged liquid line configured to introduce a first discharged liquid discharged from the gas-liquid separator into the gas-liquid separator at a position below an absorption liquid introduction port through which the absorption liquid is introduced into the gas-liquid separator;
a first heater disposed on the first discharged liquid line and configured to heat the first discharged liquid;
a second discharged liquid line configured to introduce a second discharged liquid discharged from the gas-liquid separator into the gas-liquid separator at a position below a first discharged liquid introduction port through which the first discharged liquid is introduced into the gas-liquid separator;
a mixing tank disposed on the second discharged liquid line and configured to mix the second discharged liquid with an alkaline agent; and
a solid-liquid separator disposed on the second discharged liquid line and configured to subject a mixture mixed in the mixing tank to solid-liquid separation, wherein
a mixed liquid separated by the solid-liquid separator is introduced into the gas-liquid separator through the second discharged liquid line,
the gas-liquid separator includes at least three liquid collectors located inside the gas-liquid separator and each configured to allow passage of a gas from below upward and to block passage of a liquid from above downward,
the first discharged liquid in the first discharged liquid line is an accumulated liquid accumulated in the liquid collector in the middle of the at least three liquid collectors, and the first discharged liquid introduction port through which the first discharged liquid is introduced from the first discharged liquid line into the gas-liquid separator is located between the liquid collector in the middle and the liquid collector above the liquid collector in the middle, and a second discharged liquid introduction port through which the second discharged liquid is introduced from the second discharged liquid line into the gas-liquid separator is located on a bottom part side of the liquid collector among the at least three liquid collectors which is located closest to the bottom part side.

11. The reclaiming device according to claim 10, further comprising:

a second heater disposed on the second discharged liquid line and configured to heat the mixed liquid separated by the solid-liquid separator.

12. The reclaiming device according to claim 10, further comprising:

a water introducing line configured to introduce the water into the gas-liquid separator at a position closer to the bottom part side than the liquid collector among the at least three liquid collectors which is located closest to the bottom part side; and a second heater disposed on the water introducing line and configured to heat the water.

13. An acidic gas recovery system comprising:

an absorption column configured to bring an absorption liquid into gas-liquid contact with a treatment target gas so as to absorb and remove an acidic gas from the treatment target gas;

a regeneration column configured to regenerate the absorption liquid by heating the absorption liquid having absorbed the acidic gas in the absorption column so as to cause the absorption liquid to release the acidic gas; and the reclaiming device according to claim 1, which is configured to separate coexisting materials from the absorption liquid regenerated by the regeneration column.

* * * * *